(12) United States Patent
Alholm et al.

(10) Patent No.: US 10,100,779 B2
(45) Date of Patent: Oct. 16, 2018

(54) ENHANCED DURABILITY DRIVE LINK FOR HIGH LOAD MISALIGNMENT

(71) Applicant: United Technologies Corporation, Hartford, CT (US)

(72) Inventors: Hannes A. Alholm, Tolland, CT (US); Joseph J. Czapski, Jr., New Britain, CT (US); Bessem Jlidi, Rocky Hill, CT (US); Alex J. Simpson, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/095,041

(22) Filed: Apr. 9, 2016

(65) Prior Publication Data

US 2017/0292472 A1    Oct. 12, 2017

(51) Int. Cl.
| | |
|---|---|
| *F02K 1/12* | (2006.01) |
| *B23P 15/00* | (2006.01) |
| *F16C 23/04* | (2006.01) |
| *B64C 15/00* | (2006.01) |
| *F02K 1/15* | (2006.01) |

(52) U.S. Cl.
CPC .......... *F02K 1/1292* (2013.01); *B23P 15/003* (2013.01); *B64C 15/00* (2013.01); *F02K 1/15* (2013.01); *F16C 23/043* (2013.01); *F16C 23/045* (2013.01); *F05D 2260/40* (2013.01); *F16C 2360/23* (2013.01)

(58) Field of Classification Search
CPC .... F16C 23/043; F16C 23/045; F16C 23/084; F16C 2326/43; F02C 7/32; F23P 15/008; F23P 15/003; B64D 27/10; B23P 15/008; B23P 15/003

USPC ........ 384/91, 129, 206, 208, 261, 280, 526, 384/498; 403/114, 121, 158; 411/136, 411/383; 248/554–555
See application file for complete search history.

(56) References Cited

U.S. PATENT DOCUMENTS 2,766,079 A * 10/1956 Browne .............. F16C 11/0614
                                                                     384/209
3,464,747 A    9/1969 Schmidt
(Continued)

FOREIGN PATENT DOCUMENTS

DE    2915088        10/1980
EP    2559883 A2 *   2/2013 ................ F02C 7/32
(Continued)

OTHER PUBLICATIONS

EP Search Report dated Sep. 8, 2017 in EP Application No. 17155049.4.

*Primary Examiner* — Marcus Charles
(74) *Attorney, Agent, or Firm* — Snell & Wilmer, L.L.P.

(57) ABSTRACT

A drive link assembly includes a case having a spherically formed inner ring. A clevis is affixed to a surface of the case such that is disposed horizontally between a first end and a second end of the clevis. A spacer having a spherical inset portion is positioned on the surface horizontally between the clevis and the spherically formed inner ring, such that the spherical inset portion is aligned with the spherically formed inner ring. A spherical bearing is seated within the spherically formed inner ring. A rod is affixed to an outer surface of the spherical bearing.

20 Claims, 5 Drawing Sheets

(56) References Cited

U.S. PATENT DOCUMENTS

| | | | | |
|---|---|---|---|---|
| 4,243,192 A * | 1/1981 | Johnson | B64C 3/40 | 244/131 |
| 4,385,673 A * | 5/1983 | Olt, Jr. | B62D 55/0842 | 180/9.5 |
| 4,808,023 A * | 2/1989 | Arnold | F16C 11/045 | 403/157 |
| 4,943,013 A | 7/1990 | Kapala | | |
| 5,058,829 A * | 10/1991 | Bentley | B64D 11/0696 | 244/118.6 |
| 5,178,220 A * | 1/1993 | Cevolini | A01B 63/112 | 172/12 |
| 6,330,995 B1 * | 12/2001 | Mangeiga | B64D 27/26 | 244/54 |
| 6,371,681 B1 * | 4/2002 | Covington | B64C 27/605 | 244/17.11 |
| 7,753,612 B2 * | 7/2010 | Bouru | F16C 11/045 | 403/123 |
| 8,083,177 B2 * | 12/2011 | Renon | B64D 27/26 | 244/54 |
| 8,596,603 B2 * | 12/2013 | Gallet | F01D 25/162 | 244/53 R |
| 8,622,644 B2 * | 1/2014 | Becker | F16C 11/045 | 403/134 |
| 8,851,417 B2 * | 10/2014 | Sandy | B64D 27/26 | 244/54 |
| 2015/0166189 A1 * | 6/2015 | Cassagne | F02C 7/20 | 244/54 |
| 2015/0167726 A1 * | 6/2015 | Cassagne | F16B 39/24 | 411/136 |

FOREIGN PATENT DOCUMENTS

| | | | | |
|---|---|---|---|---|
| EP | 2851219 A1 * | 3/2015 | | B60D 5/00 |
| FR | 3014970 A1 * | 6/2015 | | F16C 11/045 |

* cited by examiner

ENHANCED DURABILITY DRIVE LINK FOR HIGH LOAD MISALIGNMENT

GOVERNMENT LICENSE RIGHTS

This disclosure was made with government support under FA8626-15-D-0015-3501 and N00019-02-C-3003, both of which were awarded by United States Navy. The government has certain rights in the disclosure.

FIELD OF THE DISCLOSURE

The subject matter disclosed herein relates to drive link assemblies.

BACKGROUND OF THE DISCLOSURE

A drive link may be used to provide stability while allowing precision movements to an articulated part, such as an articulated nozzle for a gas turbine jet engine. As used herein, a drive link comprises at least a rod end bearing, which is a mechanical articulating joint.

A drive link configured for use in high-load applications often includes high misalignment spherical bearings. Under very high or abnormal amounts of stress or load, conventional hubs that typically cover the bearing are susceptible to fractures. This type of fracture is often initiated by a bearing pin that bends under high tensile stress. The fracture point is typically within the internal diameter and near the edge of the bearing hub.

SUMMARY OF THE DISCLOSURE

In various embodiments, the present disclosure provides a drive link that includes a case having a spherically formed inner ring. Clevis is affixed to a surface area of the case, adjacent a parameter of the spherically formed inner ring. Spacers, each having a spherical inset portion, are positioned on the case surface adjacent the clevis. The spherical inset portions of the spacers are generally aligned with the spherically formed inner ring. A spherical bearing is seated within the spherically formed inner ring, with the spacers lining the perimeter of the spherically formed inner ring. A rod is affixed to an outer surface of the spherical bearing.

In various embodiments, the spherically formed inner ring comprises a through-hole centrally positioned in a surface of the case. The outer diameter of the spherical bearing may be less than the diameter of the spherically formed inner ring. In various embodiments, an outer diameter of the spherical bearing is less than a diameter of the spherically formed inner ring. The spacer may comprise either metal, ceramic, mineral, glass, or plastic. The spacers reduce a range of motion for the spherical bearing. In various embodiments, the rod includes a rod second end and the second end is attached to an articulated nozzle for a gas turbine engine. Modifying the size and shape of a spacer is may be performed based on a desired range of motion. The spacer may further include a spherical inset portion.

In various embodiments, the present disclosure includes a method of manufacturing a drive link including molding a case having a spherically formed inner ring. A clevis is affixed to a horizontal surface of the case adjacent a parameter of the spherically formed inner ring. A spacer is positioned on the horizontal surface adjacent the clevis, the spherical inset portion aligned with the spherically formed inner ring. A spherical bearing is inserted within the spherically formed inner ring and the spacer of the case and a rod is attached to an outer surface of the spherical bearing.

In various embodiments, the present disclosure includes a method for installing a drive link to a nozzle assembly that includes attaching a rod first end of a rod to an actuator and attaching a rod second end of the rod to an outer surface of a spherical bearing. A spherical bearing is seated within a spherically formed inner ring, wherein the spherically formed inner ring is positioned within a case and adjacent a clevis. A clevis first end is connected to a lug and a clevis second end is connected to a case. A spacer is positioned on the case adjacent to the clevis, wherein the spacer includes a spherical inset portion in alignment with the spherically formed inner ring.

In various embodiments, the spherically formed inner ring comprises a vertical through-hole centrally positioned in a surface of the case. An outer diameter of the spherical bearing is less than a diameter of the spherically formed inner ring.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

An X-Y-Z coordinate system is shown in FIGS. 1-4 for spatial reference purposes, with the orthogonal X and Y-axes defining a horizontal X-Y plane to which the Z-axis is perpendicular. As used herein, the term "vertically extending" includes exactly vertical (i.e., exactly parallel to the Z-axis) and approximately vertical (i.e., approximately parallel to the Z-axis), while the term "horizontally extending" includes exactly horizontal (i.e., exactly parallel to the X-Y plane) and approximately horizontal (i.e., approximately parallel to the X-Y plane).

As used herein, terms such as "under", "below", "on-top", "above", etc., may be used in describing relative position along the axis, with on top and above reflecting positive Z displacement and under and below reflecting negative Z displacement.

Figure 1:
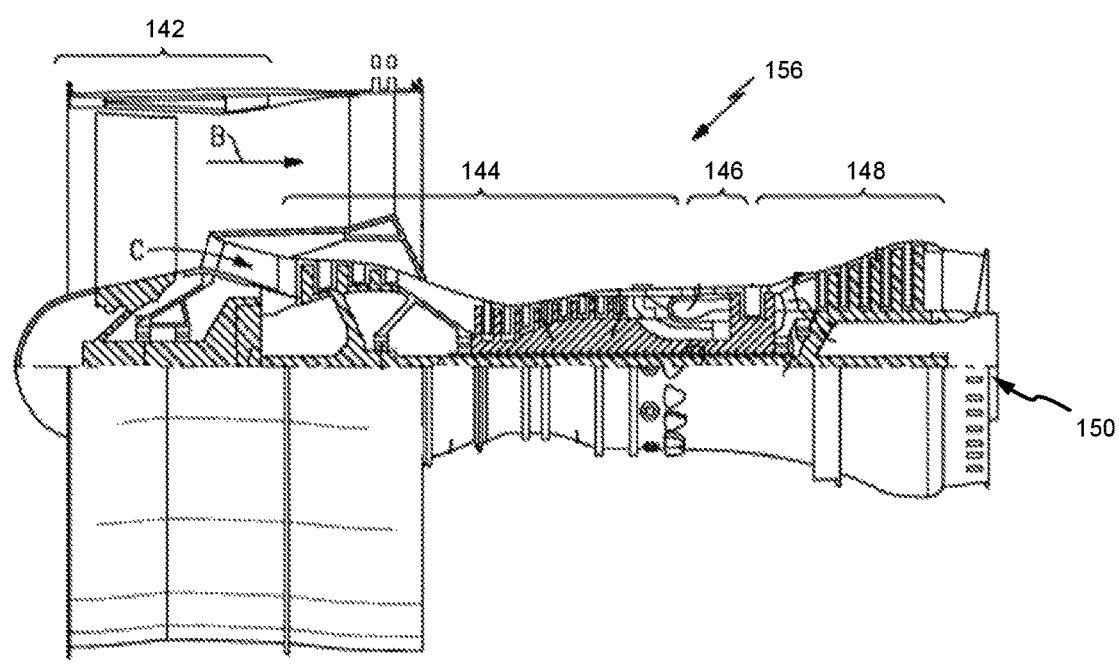
FIG. 1 is a schematic view of an example gas turbine engine in accordance with various embodiments.

FIG. 1 schematically illustrates an example gas turbine engine 156 that includes a fan 142, a compressor 144, a combustor 146 and a turbine 148. Alternative engines might include an augmenter (not shown) among other systems or features. The fan 142 drives air along a bypass flow path B while the compressor 144 draws air in along a core flow path C where air is compressed and communicated to a combustor 146. In the combustor 146, air is mixed with fuel and ignited to generate a high-pressure exhaust gas stream that expands through the turbine 148 where energy is extracted and utilized to drive the fan 142 and the compressor 144. The exhaust gas stream is expelled from gas turbine engine 156 through nozzle 150.

In various embodiments, nozzle 150 may be articulated, which supports variable jet area for engine control and thrust management. In various embodiments, a drive link assembly may be used to both provide a sturdy connection with the articulated nozzle 150, which is secure while not being overly rigid. In various embodiments, a rod end bearing configuration for the drive link assembly may provide one or more desired features.

Although the disclosed embodiments frequently depict a drive link assembly relative to a gas turbine engine, it should be understood that the drive link assembly described herein is not limited to use with gas turbine engines.

Figure 2:
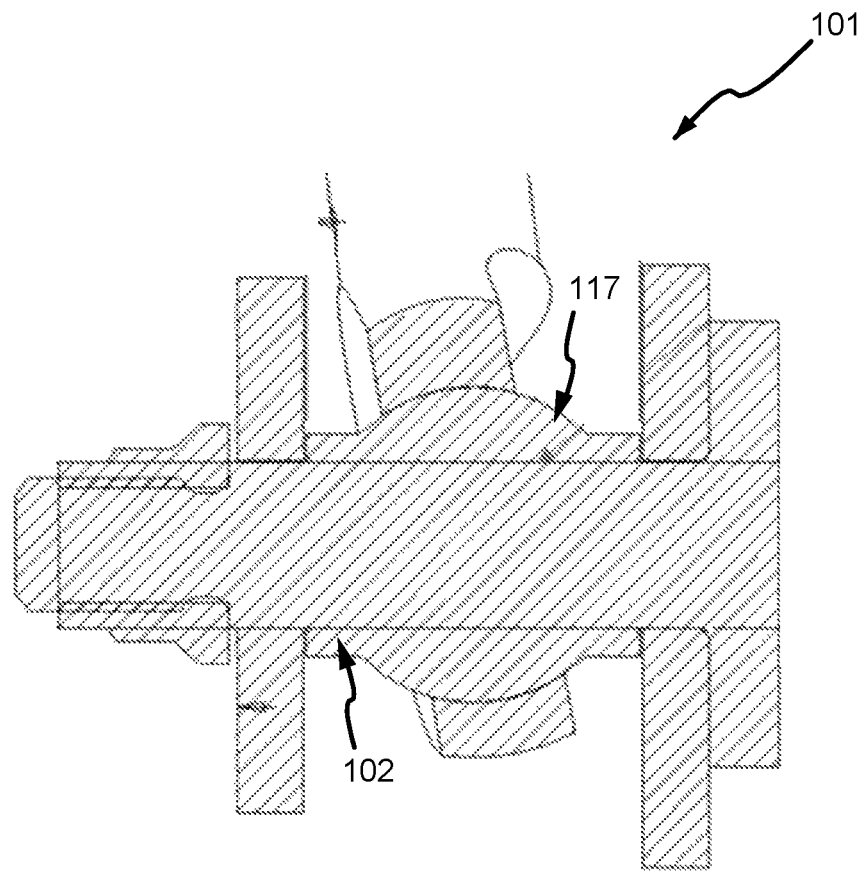
FIG. 2 illustrates a drive link assembly with a bearing hub.

FIG. 2 illustrates a drive link assembly 101 having a spherical bearing comprising a hub 102 that is integral to the spherical bearing. Removal of the hub 102 from the spherical bearing eliminates the risk that hub 102 will fracture and reduces and/or minimizes the risk that the spherical bearing will fracture. As described herein, a number of spacers, which each comprise a flanged bushing, may replace the functionality of the hub while preserving a desired range of motion for a drive link assembly.

Figure 3:
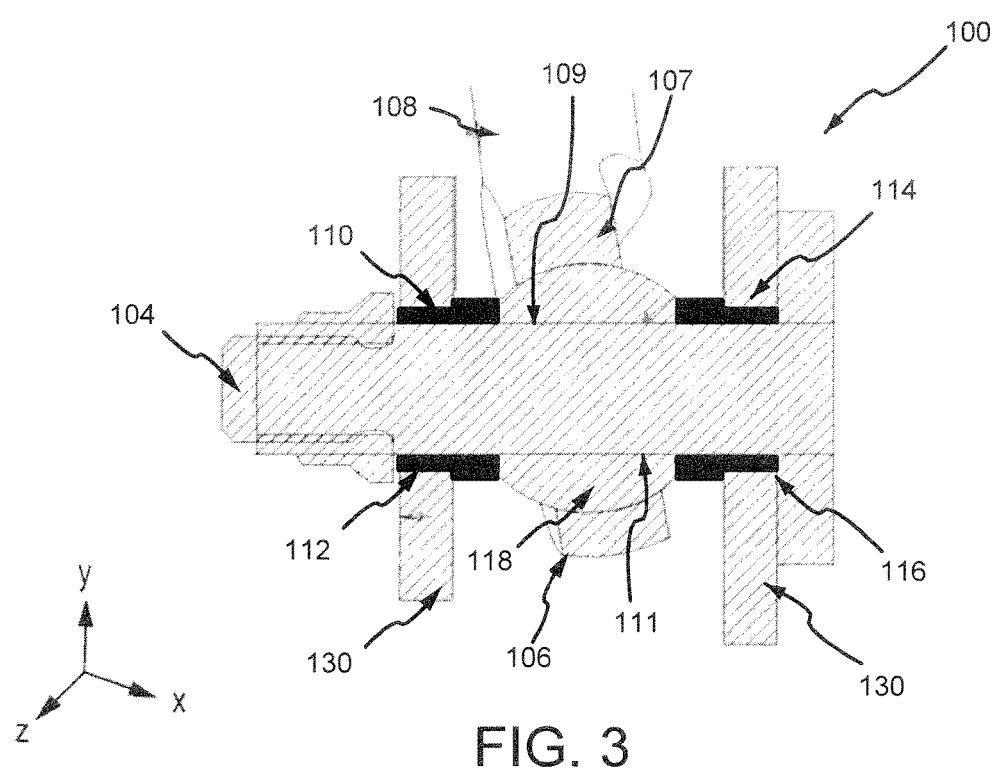
FIG. 3 illustrates a drive link assembly with spacers replacing a bearing hub.
Figure 4:
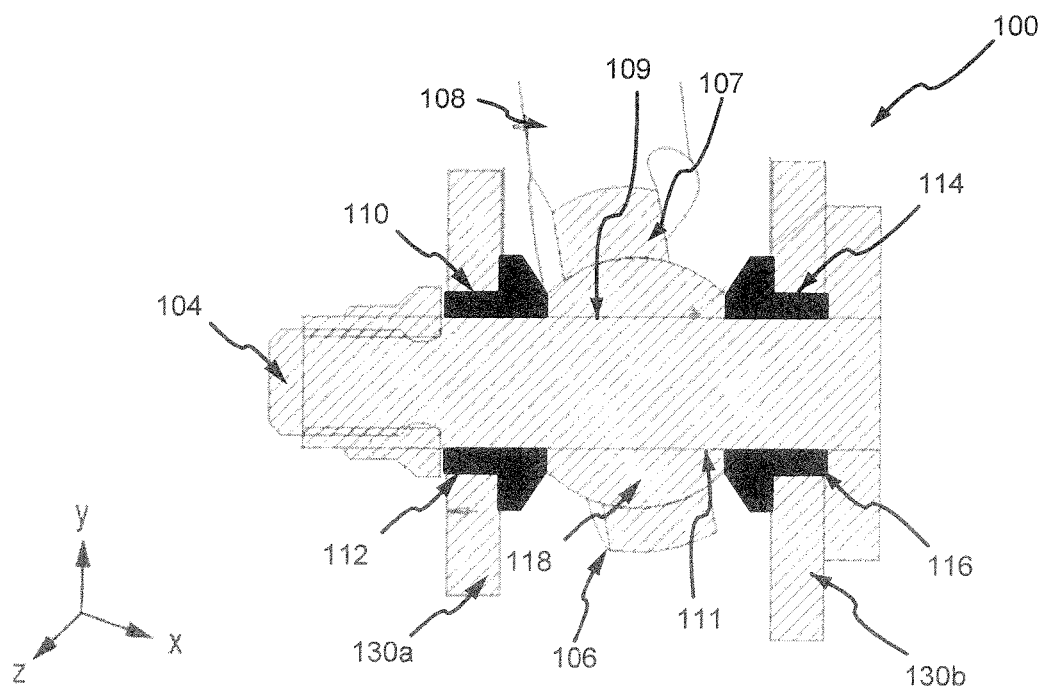
FIG. 4 illustrates a drive link assembly with spacers replacing a bearing hub in accordance with various embodiments.

With brief reference to FIGS. 2, 3, and 4, to preserve the misalignment or tilt capability of a drive link assembly 100, the functionality of hub 102 is replaced with spacers 110, 112, 114, 116, allowing hub 102 to be removed and eliminating the risk that hub 102 will fracture, which may be a consequence of deflection or pending of pin 104. Specifically, tilt capability and general range of motion is preserved or enhanced by positioning of spacers 110, 112, 114, 116 along a side portion the case 106 and in alignment with the spherically formed inner ring 107.

In various embodiments, and with reference to FIGS. 3 and 4, the present disclosure provides a drive link assembly 100 that includes a case 106 having a spherically formed inner ring 107. Clevis 130 may be affixed to case 106 via a pin 104 extending through a clevis first end, spherically formed inner ring 107, and a clevis second end, such that the spherically formed inner ring 107 is disposed horizontally between the clevis first end and the clevis second end. Spacers 110, 112, 114, 116, may each comprise a spherical inset portion. Spacers 110, 112, 114, 116, may be positioned on pin 104 between case 106 and the clevis first end and the clevis second end and/or between clevis 130 and spherically formed inner ring 107. The spherical inset portions of spacers 110, 112, 114, 116 may be generally aligned with spherically formed inner ring 107. In various embodiments, a spherical bearing 118 is seated within spherically formed inner ring 107, such that spacers 110, 112, 114, 116 line one or more perimeter of spherically forming inner ring 107. In various embodiments, a rod 108 is affixed to an outer surface of case 106 spherical bearing 11g.

Referring to FIG. 3 and FIG. 4, in various embodiments, a spherical bearing 118 may be centered vertically and/or horizontally relative to a drive link assembly 100 by spacers 110, 112, 114, 116. In various embodiments, spherical bearing 118 may be secured to drive link assembly 100 by spacers 110, 112, 114, 116. In various embodiments, spacers 110, 112, 114, 116 may function to preserve spherical bearing 118 misalignment. In various embodiments, spacers 110, 112, 114, 116 have a spherical inset portion that faces and/or abuts the spherical bearing 118, such that the spherical inset portion is complementary to the contour of spherical bearing 118.

In various embodiments, spacers 110, 112, 114, 116 function to secure spherical bearing 118, maintaining free rotation of spherical bearing 118 about the X-axis while preventing horizontal and/or vertical movement of spherical bearing 118 under various loads. In various embodiments, replacement of hub 102 with spacers 110, 112, 114, 116 may cause a shear plane to occur nearer a point where the rod 108 attaches to the spherical bearing 118. In various embodiments, replacement of hub 102 with spacers 110, 112, 114, 116 may reduce deflection of a pin 104 and/or increase even distribution of load.

FIG. 3 illustrates a drive link assembly having a configuration of spacers 110, 112, 114, 116, while FIG. 4 illustrates a drive link assembly having an alternative arrangement of spacers 110, 112, 114, 116. Various configurations of spacers 110, 112, 114, 116 may be presented and described herein, for the purpose of explanation only. Those of ordinary skill in the art will appreciate that many additional configurations may be implemented based on any number of properties. It is also contemplated that properties beyond those described herein, may directly or indirectly influence overall functionality and performance of the drive link assembly 100.

In various embodiments, bearing alignment and retention functions provided by hub (FIG. 2, 102) are replaced by spacers 110, 112, 114, 116. Some functions are replaced or modified while still others are introduced by way of spacers 110, 112, 114, 116. Such functions include, for example, maintaining or increasing the spherical bearing 118 and/or rod 108 range of motion, while eliminating hub (FIG. 2, 102) fracture risks. Modifying the shapes and sizes of spacers 110, 112, 114, 116 may further influence these functions and/or their outcomes.

In various embodiments, secondary considerations, not directly relating to variations among spacers 110, 112, 114, 116 configurations, may create varied results. For example, performance parameters relating to overall stability in an articulated nozzle may change based on spherical bearing 118 manufacturing processes, rather than a size reduction to spacers 110, 112, 114, 116. Put another way, a single configuration of spacers 110, 112, 114, 116 may create varied outcomes based on differences among drive link assembly 100 configurations. As such, physical properties of spacers 110, 112, 114, 116 may be specifically defined based on implementation properties. For example, it might be determined that the shape of spacers 110, 112, 114, 116 affect the range of motion for the spherical bearing 118. As such, the shape of spacers 110, 112, 114, 116 may be modified in light of attributes that vary among implementations, such as when a first implementation requires less range of motion than a second implementation.

In various embodiments, spherically formed inner ring 107 comprises a through-hole centrally positioned in a surface of case 106. In various embodiments, an outer diameter of spherical bearing 118 may be less than the diameter of the spherically formed inner ring 107. In various embodiments, spacers 110, 112, 114, 116 may comprise metal, ceramic, mineral, glass, plastic, and/or any other suitable material. In various embodiments, spacers 110, 112, 114, 116 reduce a range of motion of spherical bearing 118. In various embodiments, rod 108 is attached to an articulated nozzle for a gas turbine engine. In various embodiments, the size and shape of spacers 110, 112, 114, 116 may be performed based on a desired range of motion. In various embodiments, spacers 110, 112, 114, 116 may further include a spherical inset portion.

Figure 5:
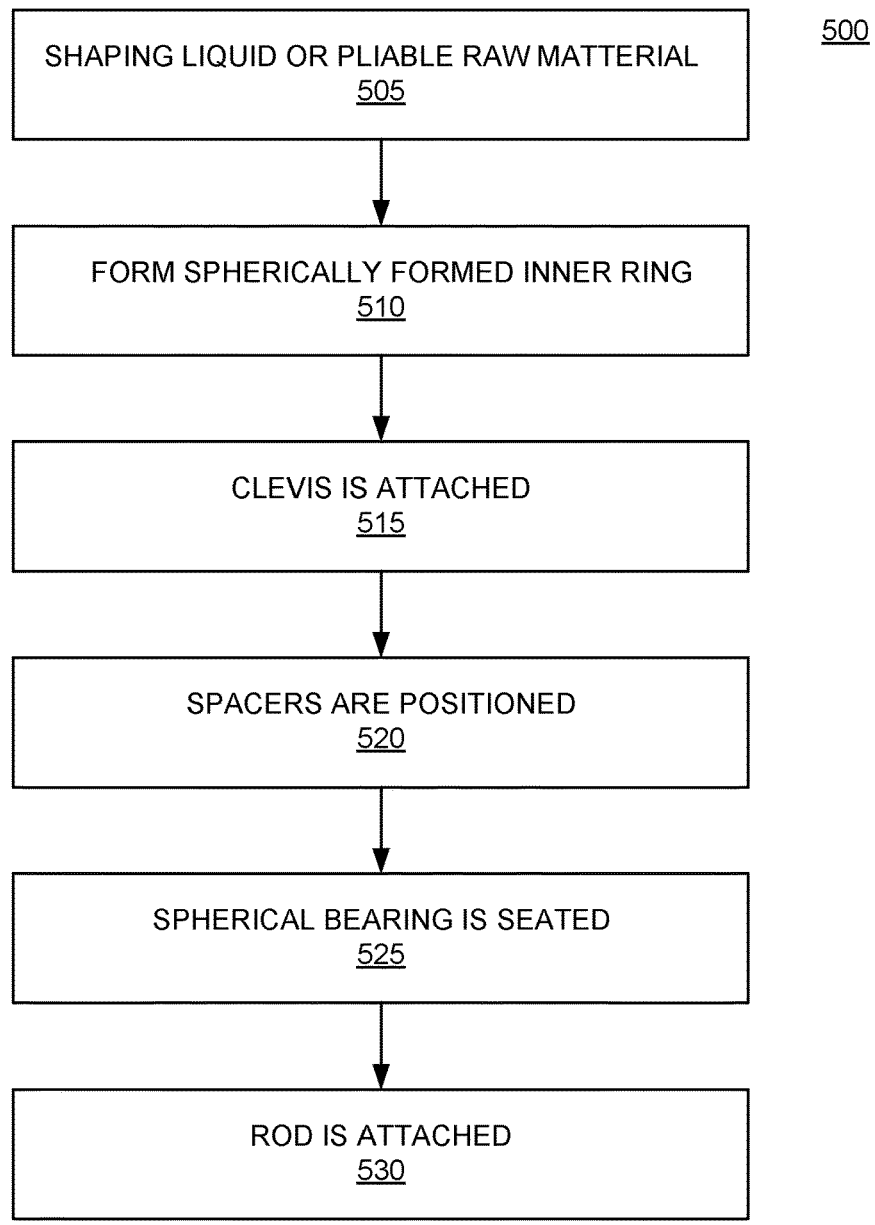
FIG. 5 illustrates a process for producing drive link assembly in accordance with various embodiments.

With reference to FIG. 5, a process is described for producing a drive link assembly having the unique features variously described herein. Reference is also made to the components illustrated in FIGS. 3 and 4. It is contemplated that the order of execution for the following process steps may be modified. Moreover, these process steps are presented for explanation only. As such, various steps may be omitted, added, and/or combined without departing from the scope of the disclosure.

A case 106 that is configured to maintain a spherical bearing 118 may be produced through a process of manufacturing 500 that includes shaping liquid or pliable raw material (step 505) to mold/form the case 106. In various embodiments, a mold for case 106 is filled with metal, ceramic, mineral, glass, or plastic. Case 106 includes a spherically formed inner ring 107, which may be cut from or formed into case 106 (step 510), such that the spherically formed inner ring 107 is characterized by an open bore or vertical through-hole.

Clevis 130, functioning as anchoring points for the drive link assembly 100, is attached (step 515) to a surface portion of the case 106. In various embodiments, clevis 130 comprises an elongated cylinder that is shaped or molded from a metal, ceramic, mineral, glass, or plastic. In various embodiments, clevis 130 is affixed to an upper horizontal surface area 109 and/or lower horizontal surface area 111 of pin 104, such that clevis 130 extends vertically.

In various embodiments, spacers 110, 112, 114, 116 are positioned (step 520) along upper horizontal surface 109 and/or lower horizontal surface 111 (i.e., parallel to the X-Y plane) of pin 104. In various embodiments, spacers 110, 112, 114, 116 are disposed adjacent to clevis 130 and/or between a clevis first end 130a and a clevis second end 130b of clevis 130. In various embodiments, the spacers 110, 112, 114, 116 may comprises a metal, ceramic, mineral, glass, or plastic. The spacers 110, 112, 114, 116 may be formed or molded into various shapes of various sizes. In various embodiments, spacers 110, 112, 114, 116 are formed to include spherical inset portions. In various embodiments, spacers 110, 112, 114, 116 are positioned such that the inset portions face and/or abut spherical bearing 118 and/or are generally aligned with a spherically formed inner ring 107.

A spherical bearing 118 is seated (step 525) within the spherically formed inner ring 107 of the case 106 and is disposed horizontally between spacers 110, 112, 114, 116. In various embodiments, the position of spherical bearing 118 is maintained within the spherically formed inner ring 107 by spacers 110, 112, 114, 116. A rod 108 is attached (step 530) to spherical bearing 118 to provide movement to, for example, an articulated nozzle of a gas turbine engine.

Figure 6:
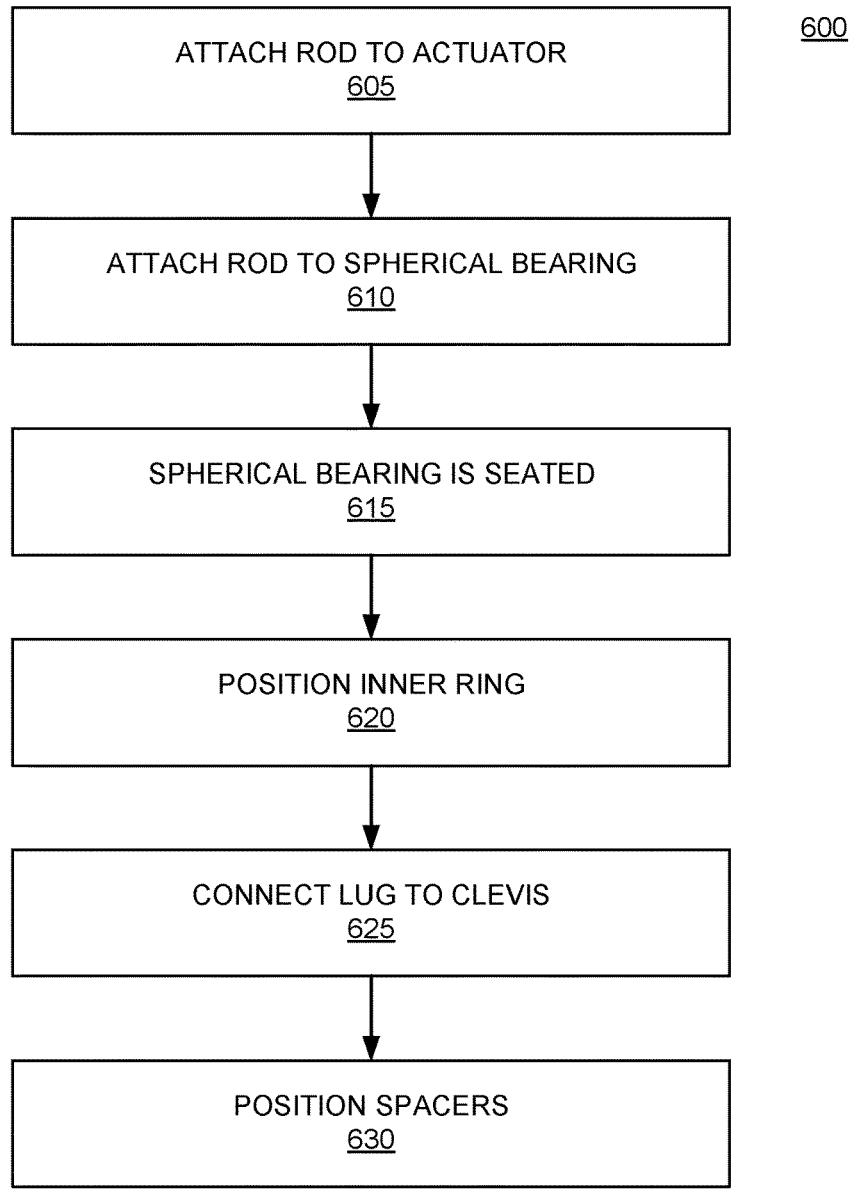
FIG. 6 illustrates a process for installing a drive link assembly in accordance with various embodiments.

FIG. 6 illustrates a process for installing a drive link assembly 100 in accordance with various embodiments. In various embodiments, the drive link assembly 100 may be installed in a gas turbine engine where it facilitates precise movements of an articulated nozzle. A rod first end of a rod 108 that translates motion to the articulated nozzle may be attached to an actuator (step 605), while a rod second end of rod 108 may be attached to case 106 of drive link assembly 100 (step 610). Spherical bearing 118 is seated within spherically formed inner ring 107 of case 106 (step 615), wherein the spherically formed inner ring 107 is positioned adjacent a clevis 130 (step 620). Clevis 130 comprises a clevis first end and a clevis second end attached to a horizontal surface 109, 111 of a pin 104 (step 625). Spacers 110, 112, 114, 116, including a spherical inset portion, may be positioned on horizontal surface 109, 111 of pin 104 adjacent clevis 130 and/or between the clevis first end and the clevis second end of clevis 130 (step 635), such that the spherical inset portions are in alignment with spherically formed inner ring 107.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices and methods are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A drive link assembly comprising:
    a case having a spherically formed inner ring section;
    a clevis affixed to the case such that the spherically formed inner ring section is disposed horizontally between a first end and a second end of the clevis;
    a spherical bearing seated within the spherically formed inner ring section;
    a first spacer positioned horizontally between the first end of the clevis and the spherical bearing, wherein an inset portion of the first spacer is adjacent the spherical bearing and comprises a first sloped surface extending away from the spherical bearing;
    a second spacer positioned horizontally between the second end of the clevis and the spherical bearing, wherein an inset portion of the second spacer is adjacent the spherical bearing and comprises a second sloped surface extending away from the spherical bearing; and
    a rod having a rod first end, the rod first end being integral with an outer surface of the case, wherein an axial thickness of the spherically formed inner ring section is less than an diameter of the rod.

2. The drive link assembly of claim 1, wherein the spherically formed inner ring section is characterized by an open bore.

3. The drive link assembly of claim 1, wherein an outer diameter of the spherical bearing is less than an inner diameter of the spherically formed inner ring section.

4. The drive link assembly of claim 1, wherein the first spacer and the second spacer comprise at least one of metal, ceramic, mineral, glass, or plastic.

5. The drive link assembly of claim 1, wherein the first spacer and the second spacer reduce a range of motion for the spherical bearing.

6. The drive link assembly of claim 1, wherein the rod further comprises a rod second end.

7. The drive link assembly of claim 6, wherein the rod second end is attached to an articulated nozzle for a gas turbine engine.

8. The drive link assembly of claim 1, wherein a size and shape of the first spacer and the second spacer is modified based on a desired range of motion.

9. A method of manufacturing a drive link comprising:
    forming a case having a spherically formed inner ring section;
    affixing a clevis to the case such that the spherically formed inner ring section is disposed horizontally between a first end and a second end of the clevis;
    inserting a spherical bearing within the spherically formed inner ring section;
    positioning a first spacer horizontally between the first end of the clevis and the spherical bearing such that a sloped surface of an inset portion of the first spacer extends away from the spherical bearing;
    positioning a second spacer horizontally between the second end of the clevis and the spherical bearing such that a sloped surface of an inset portion of the second spacer extends away from the spherical bearing; and
    forming a rod extending from an outer surface of the case, wherein a rod first end is integral with the outer surface of the case, and wherein an axial thickness of the spherically formed inner ring section is less than a diameter of the rod.

10. The method of claim 9, wherein the spherically formed inner ring section is characterized by an open bore.

11. The method of claim 9, wherein an outer diameter of the spherical bearing is less than a diameter of the spherically formed inner ring section.

12. The method of claim 9, wherein the first spacer and the second spacer comprise at least one of metal, ceramic, mineral, glass, or plastic.

13. The method of claim 9, wherein the first spacer and the second spacer reduce bending-based stress.

14. The method of claim 9, wherein a size and shape of the first spacer and second spacer are modified based on a desired range of motion.

15. The method of claim 9, wherein the first spacer and the second spacer include a first spherical inset portion and a second spherical inset portion.

16. The method of claim 9, further comprising attaching a rod second end of the rod to an articulated nozzle.

17. A method for installing a drive link to a nozzle assembly comprising:
    attaching a rod first end of a rod to an actuator;
    attaching a rod second end of the rod to an outer surface of a case having a spherically formed inner ring section, wherein the rod second end is integral with the outer surface of the case, and wherein an axial thickness of the spherically formed inner ring section is less than a diameter of the rod;
    seating a spherical bearing within the spherically formed inner ring section, wherein the spherically formed inner ring is disposed between a first end and a second end of a clevis;
    positioning a first spacer between the first end of the clevis and the spherical bearing; and
    positioning a second spacer the second end of the clevis and the spherical bearing.

18. The method of claim 17, wherein the spherically formed inner ring section is characterized by an open bore.

19. The method of claim 17, wherein an outer diameter of the spherical bearing is less than a diameter of the spherically formed inner ring section.

20. The method of claim 17, wherein a first sloped surface of an inset portion of the first spacer extends away from the spherical bearing, and wherein a second sloped surface of an inset portion of the second spacer extend away from the spherical bearing.

* * * * *